US008065619B2

(12) United States Patent
Agarwal et al.

(10) Patent No.: US 8,065,619 B2
(45) Date of Patent: Nov. 22, 2011

(54) CUSTOMIZED TODAY MODULE

(75) Inventors: Deepak Agarwal, San Jose, CA (US);
Bee-Chung Chen, Sunnyvale, CA (US);
Pradheep Elango, Mountain View, CA (US); Nitin Motgi, Santa Clara, CA (US); Vijay K. Narayanan, Mountain View, CA (US); Raghu Ramakrishnan, Los Altos, CA (US); Howard Scott Roy, Palo Alto, CA (US); Amitabh Seth, Saratoga, CA (US); Vik Singh, San Jose, CA (US); Joe Zachariah, San Jose, CA (US); Sharat Israni, Portola Valley, CA (US); John Thrall, San Francisco, CA (US); Chandar Venkataraman, Cupertino, CA (US); Amit Phadke, Sunnyvale, CA (US); Michael Salisbury, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 810 days.

(21) Appl. No.: 11/899,401

(22) Filed: Sep. 4, 2007

(65) Prior Publication Data

US 2009/0063984 A1 Mar. 5, 2009

(51) Int. Cl.
*G06F 3/00* (2006.01)
(52) U.S. Cl. ............... 715/742; 715/744; 715/745
(58) Field of Classification Search .......... 715/742, 715/744, 733, 703, 716, 745, 746, 747
See application file for complete search history.

(56) References Cited

U.S. PATENT DOCUMENTS

| 6,128,663 | A | * | 10/2000 | Thomas | 709/228 |
|---|---|---|---|---|---|
| 6,438,579 | B1 | | 8/2002 | Hosken | |
| 6,442,577 | B1 | | 8/2002 | Britton | |
| 6,904,408 | B1 | | 6/2005 | McCarthy | |
| 6,947,922 | B1 | * | 9/2005 | Glance | 1/1 |
| 7,028,072 | B1 | | 4/2006 | Kliger | |
| 7,200,801 | B2 | | 4/2007 | Agassi | |
| 7,203,909 | B1 | * | 4/2007 | Horvitz et al. | 715/765 |
| 7,243,129 | B1 | | 7/2007 | Thomas | |

(Continued)

OTHER PUBLICATIONS

"Notification of Transmittal of the International Search Report and the Written Opinion of the International Searching Authority, or the Declaration" received in corresponding International application No. PCT/US2008/075143 dated Feb. 25, 2009 (11 pages).

(Continued)

*Primary Examiner* — Weilun Lo
*Assistant Examiner* — Rashedul Hassan
(74) *Attorney, Agent, or Firm* — Hickman Palermo Truong & Becker LLP

(57) ABSTRACT

A method and apparatus for customizing content presented to individual users or user segments is provided. There may be three components, a web portal and toolbar component, a modeling component, and a scoring component. The web portal and toolbar component presents content items and collects data. The web portal and toolbar component generates user event data based on the user actions. The user event data is forwarded to the modeling component. The modeling component generates content scoring functions based on user event data and attributes of content items. Content scoring functions may be unique to individual user segments. The content scoring functions based on content features generate probability a content item will be viewed. The scoring component decides which content items are placed in a portal. The scoring component uses the scoring functions generated by the modeling component to rank content items in real time.

8 Claims, 4 Drawing Sheets

U.S. PATENT DOCUMENTS

| | | |
|---|---|---|
| 7,249,197 B1 | 7/2007 | Roestenburg |
| 2003/0040850 A1* | 2/2003 | Najmi et al. ........................ 701/1 |
| 2003/0061239 A1 | 3/2003 | Yoon |
| 2004/0044571 A1* | 3/2004 | Bronnimann et al. ........... 705/14 |
| 2005/0193335 A1* | 9/2005 | Dorai et al. .................... 715/530 |
| 2005/0267973 A1* | 12/2005 | Carlson et al. ................. 709/228 |
| 2007/0260624 A1* | 11/2007 | Chung et al. ................... 707/101 |
| 2007/0266025 A1 | 11/2007 | Wagner et al. |
| 2008/0201643 A1* | 8/2008 | Nagaitis et al. ................ 715/738 |
| 2008/0270151 A1* | 10/2008 | Mahoney et al. .................. 705/1 |
| 2009/0138326 A1 | 5/2009 | Shi |
| 2011/0016121 A1 | 1/2011 | Sambrani |

OTHER PUBLICATIONS

International Searching Authority, International Search Report for PCT application No. PCT/US2010/041960 with written Opinion dated Feb. 18, 2011, 9 pages.

Current claims for PCT application No. PCT/US2010/041960, 4 pgs.

* cited by examiner

| | |
|---|---|
| TIMESTAMP | TIME OF THE ENTRY |
| IP | IP ADDRESS |
| USER | ID IDENTIFYING THE USER |
| ITEM | ID IDENTIFYING THE ITEM |
| CONTEXT | ID IDENTIFYING CONTEXT, PAGE AND MODULE |
| ACTION | USER ACTION, (CLICK, HOVER, VIEW) |
| PAGEVIEW | ORIGINAL PAGE VIEW FOR THE ITEM FOR THE USER |
| POSITION | ID IDENTIFYING POSITION OF ITEM IN CONTEXT |
| TYPE | THE ITEM TYPE |

FIG. 2

CUSTOMIZED TODAY MODULE

FIELD OF THE INVENTION

The present invention relates to predicting a type of content a user might find pertinent based on interactions the user or other users have had with other types of content.

BACKGROUND

Web portals are massive systems where users come to consume content. Traditionally, web portals treat every visitor in the same manner in which all users are shown the same content. However, every user brings a unique set of preferences to the portal, and is interested in content that might not necessarily reflect the interests of others. Web portals have attempted to customize content for users, some web portals group content per language, other web portals allow customization of a news section so that whenever users visit the portal, the type of news stories users are registered for are shown to each user. Greater degrees of customization of content require more storage and processing power and hence encounter scalability issues. Web portals constantly intake vast quantities of content such as video, news stories, blogs, shopping sites. The content is processed to derive features that characterize it succinctly. Some examples include organizing the content in a hierarchy, describing content using methods from information retrieval. User behavior also varies widely, for example, some users visit a portal once every ten minutes, other users might visit once a day, or once a week, or even once a month. One challenge has been personalizing web content for each user based on the user's historic behavior.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 depicts attributes of user event generated data, according to an embodiment of the current invention;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for tracking user behavior across multiple sections of a web portal and then predicting based on user behavior on other sections of the portal, the type of content the user might enjoy. Previous approaches to predict and customize the type of content served to users were based on a subscription model. For example one could explicitly subscribe to specific news feeds, such as sports, technology, politics. Such approaches require active participation by users and are inflexible with respect to the type of content items provided. In other services personalization is limited to one particular type of content items.

Architectural Overview

Figure 1:
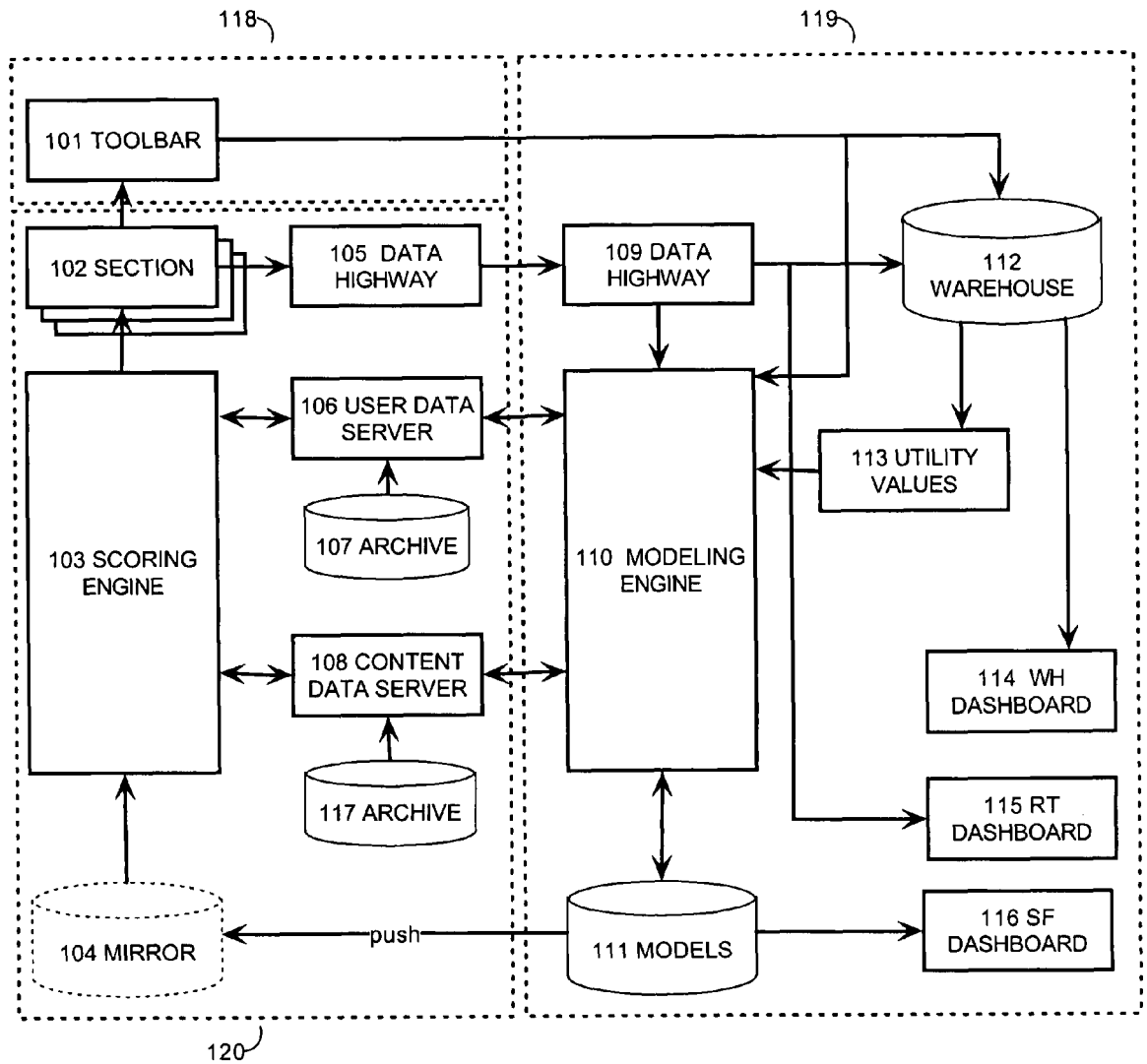
FIG. 1 depicts the architecture diagram and the data flows in the content ranking and prediction system according to an embodiment of the current invention.

FIG. 1 depicts an architecture diagram and data flows in a content ranking and prediction system according to an embodiment of the present invention. In this embodiment, the architecture has main three components, a web portal and toolbar component 118, a modeling component 119, and a scoring component 120. The web portal and toolbar component 118 is used for presentation of content items and collection of information from users. The web portal and toolbar component 118 tracks user actions and generates user event data based on the user actions. The user event data is forwarded to the modeling component 119. The modeling component generates content scoring functions based on attributes of archived user event data and attributes of content items. The modeling component 119 segments users and generates content scoring functions for individual user segments. The content scoring functions take as an input content features and provide as an output the probability with which a content item will be clicked by a user. The content scoring functions are optimized for particular contexts of the web portal. The scoring component 120 is used by the web portal to decide which content items to place in a particular section of a portal. The scoring component 120 uses the scoring functions generated by the modeling component 119 to rank content items in real time. The components with the highest rank are displayed by the web portal.

Sections

Section 102 is one of a number of distinct sections 102 of a web portal focused on providing a specific kind of information or a service. Some examples of web portal sections 102 are "real estate", "sports", or "finance". Within each section 102 a user is provided with content items related to the section 102. For example in a "Finance" property, there are tools to look up stock quotes, articles related to the stock market, videos of earnings reports, as well as ads for brokerages or financial services. Distinct sections 102 of a web portal can be hosted on separate servers.

Toolbar

The toolbar 101 is placed on the user's browser and is used to capture data about user behavior outside of the web portal. The toolbar 101 only captures data with the explicit permission of the user, in an embodiment. Therefore, web surfing data for sites outside of the web portal may be available for only a small fraction of users. The toolbar 101 contains a search bar, the information from which is used to build up a user profile and adjust content items. For example, if a user searches for vacation destinations using the toolbar 101, the information can then be used to adjust the content appearing in a portion of the welcome page of the portal, e.g., information regarding travel destinations in the case of the user.

Data Highway

The data highway 105 is a data collection and distribution mechanism. The data highway 105 collects user generated event data from servers that are hosting various sections. Every interaction of a user with a section 102 server generates event data which is collected and transmitted by the data highway 105. The data highway 105 has a corresponding data highway 109 component which distributes the collected data to the warehouse 112, the modeling engine 110, and the RT dashboard 115.

Warehouse

The warehouse 112 stores user registration data, event data and cookie information. The data is processed by the modeling engine 110 offline to derive user content preference models or content ranking functions. The modeling engine 110 uses the live data stream to adjust the content ranking model to quickly react to any changes in user content item consumption preferences. The data highway 109 also pushes the data to a RT dashboard 115 which displays real time statistics, such as the number of users for a certain section, or the click through rate for a certain element or a given section. An element on a section could be a distinct element of a web page and can be any number of entities. For example, an element can be a news story, or an interest rate calculator, or a video. The data warehouse 112 organizes user generated event data in a schema understood by the modeling engine 110.

Example Event Data

FIG. 2 shows example data that is generated for a user interaction on a section 102 of a web portal. User generated event is not required to include all of the example data. Further, user generated event data may include data not depicted in FIG. 2. Referring the FIG. 2, the following example data is shown: A timestamp, which is the time at which the event was generated. The timestamp may be generated by the server processing the user event. An IP address, the address identifying the machine that generated the event. A user attribute that uniquely identifies the user. The user attribute is populated in the event that the user is registered and logged into the web portal. An item attribute identifies with which content item a user was interacting with to generate the event. Context identifies the context, page and the module that contained the item. Action identifies the action the user performed to generate the event, an action can be but is not limited to a mouse click, hover, or view of an item. Pageview identifies the original page view containing the item for the user. Position identifies the position of the item within the context. For example, in a front of a news page, a link to a story may have the headline or alternatively be located lower in the page, that information is encoded in the position variable. Type identifies the item type, an item may be a news story, or a video, a blog etc. In addition to user interaction with content using a mouse or other pointing device, event generation is tied to browser http requests. Therefore, loading of a page triggers generation of an event tracking data structure described above.

User Event Data Processing

The data warehouse 110 may also store data that is derived from event data. Efficiency considerations drive what post processed data is stored in the warehouse. The user event data and cookies are subjected to offline analysis. Some of the data that is derived is demographic data, such as what types of users are visiting the site at a certain time during the day. User types can be divided into groups based on age, gender, geographic location. The cookie and event data is also decoded. Event data and cookies use a unique id for every item on a page. The unique id is mapped to the actual content item the unique id represents during the decoding stage. The frequency of user visits to content items are derived from the time information encoded in events.

Utility values 113 component uses data from the warehouse 112 to compute the amount of revenue content items generate in different contexts. Each content item is assigned a utility value which is used as a parameter for the modeling engine 110. For example utility values can be derived using user event data, the utility values 113 component looks at the number of visitors in a certain demographic to a given section of the portal and the number and the type of ads users in that demographic click in that section of the portal. Alternatively utility values can be computed by looking at the trajectory through the portal. A trajectory is a sequence of pages a user might follow as the user traverses content in a portal.

The dashboard 114 provides graphical representation of the long term content item performance within the today module. Various statistics for the click through rate for every content item is shown. The click through rate can be examined based on item position within the site section as well as based on certain user demographics. The dashboard also allows for customized queries of item click through performance in the various sections of the site. Dashboard 114 tracks performance of content items based on the live data stream forwarded by the data highway 109.

The modeling engine 110 takes as an input real time user event stream from the data highway 109, data from the toolbar 101, utility values 113, content item attributes from content data server 108 and derived user attributes from the UPS 106. As an output the modeling engine 110 generates a content scoring function. The content scoring function is stored in the models 111 database. The content scoring function generates a probability with which the content item will be clicked by a user in a given context. In order to derive the scoring function, users are segmented based on the registration and event data. Users are segmented by the modeling engine 110 in a manner which optimizes the prediction accuracy. The modeling engine 110 examines events generated by users who belong to each segment within a specific context such as at a certain time of the day and specific section of the site. The modeling engine 110 then generates a scoring function. The scoring function is tuned for the specific user segment and the specific portal context. A unique scoring function is generated for every user segment.

The user data 106 serves derived user attributes to the modeling engine 110 and the scoring engine 103. Archive 107 stores the derived user attributes. User attributes include but are not limited to time correlated user behavior such as what content the user looked at, at specific times, what searches the user performed, the social networks the user belongs to, age, gender etc. User attributes may be determined by content domain experts and are derived offline.

The content data server 108 is analogous to the user data 106 with respect to content items. The content data server 108 provides content attributes to the modeling engine 110 and the scoring engine 103. The Archive 117 stores the content item attributes. Some examples of content item attributes are heading, keywords, frequency of occurrence of certain words, topic categorization. Content item attributes are derived offline.

Data from the toolbar 101 and the data highway 109 are used by the modeling engine 110 in order to tune the scoring functions to be more responsive to current user preferences. For example, the scoring function should be able to accurately adjust to content items such as news stories. If real time data from the toolbar 101 and data highway 109 was not considered by the modeling engine 110, there can be a large delay between the time the news story issues and the time the news story gets reliably ranked by the modeling engine 110.

The scoring engine 103 component uses models derived by the modeling engine 110 to rank content items for specific users. The scoring engine 103 component takes as an input derived user attributes, derived content attributes, and the scoring function from the Mirror 104 database. The models 111 database pushes models generated by the modeling engine 110 to the mirror 104 database.

Modeling is a combination of real-time and offline computation. The modeling engine 110 re-computes the scoring functions at regular intervals, for example, every 20 minutes. On the other hand, the scoring engine 103 component performs computation of clicking probability in real time as the content items are served to the users.

Example Process Flow

Figure 3:
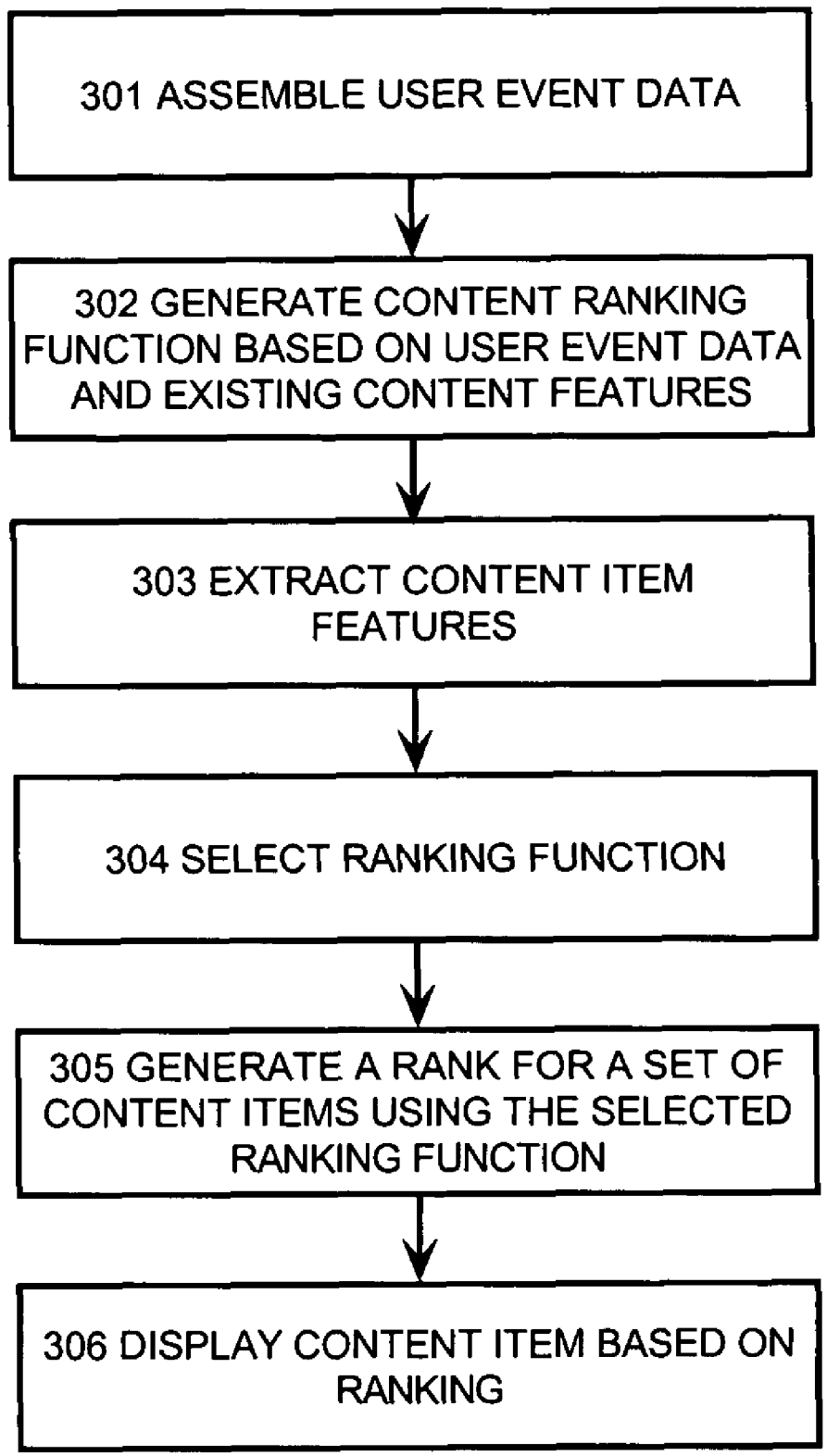
FIG. 3 depicts a flow chart of operation of the customized today module according to an embodiment of the current invention.

FIG. 3 provides a flow chart of operation of the customized today module according to an embodiment of the current invention. In step 301 user event data is generated by the web portal. The user event data is archived in the warehouse 110. Content ranking function is generated based on user event data and features extracted from existing content in step 302. One or more content ranking functions can be generated per user segment. In step 303 content features are extracted for content that does not have associated user event data. In step 304 a ranking function is selected for a user visiting the web portal. The ranking function selection can be based on the web portal context as well as the segment a user belongs to. The ranking function selected in step 304 is used to rank a set of content items based on content features in step 305. The content ranks are then used select the content item for display on the portal. The content items are displayed based on the ranking in step 306.

Hardware Overview

Figure 4:
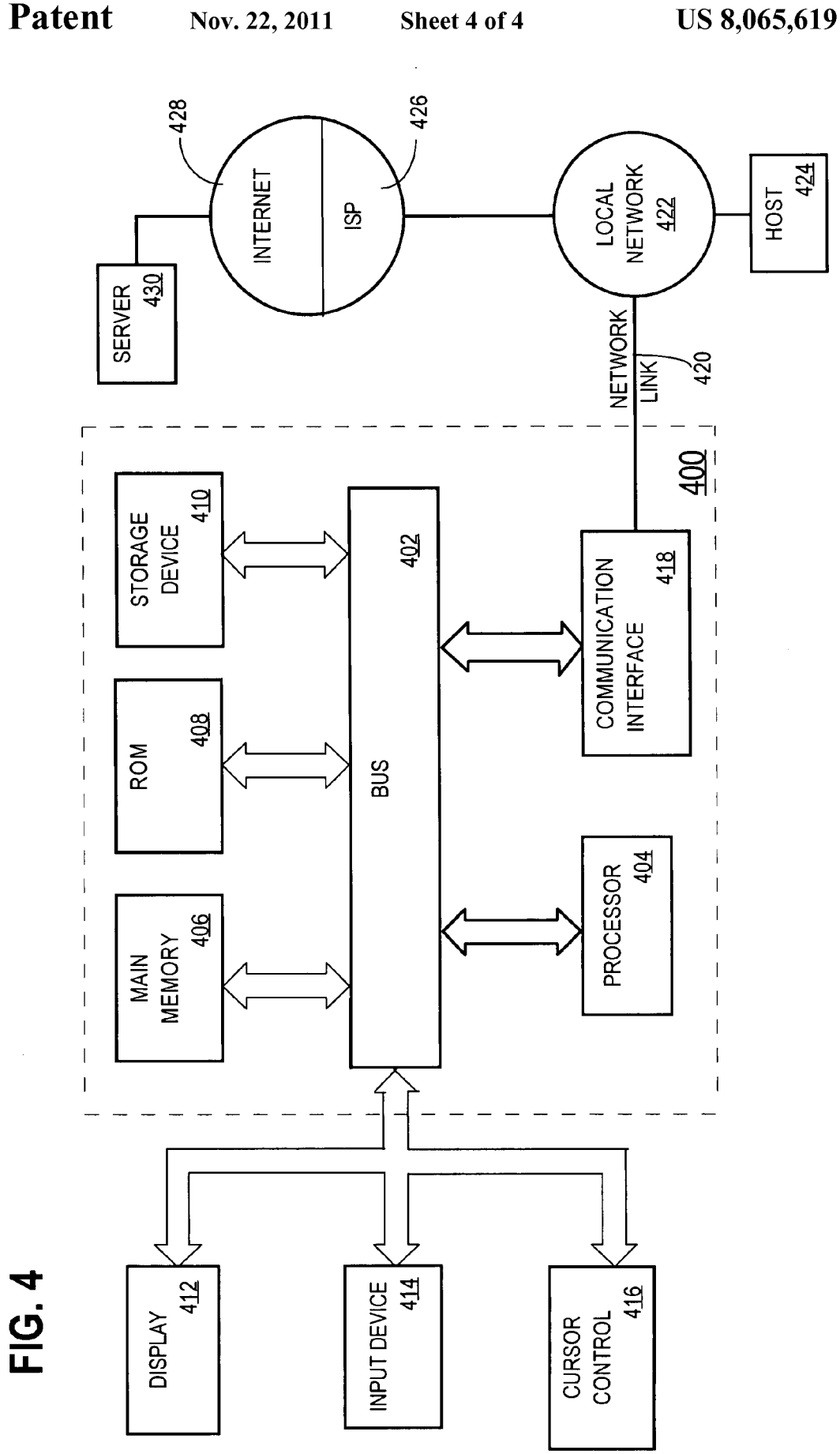
FIG. 4 is a computer system diagram according to an embodiment of the current invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising performing a machine-executed operation involving instructions, wherein said instructions are instructions which, when executed by one or more processors, cause the one or more processors to perform certain steps comprising:
   assembling user event data from a plurality of content segments on a portal;
   wherein the user event data encodes components of user interaction with first content items within each of the plurality of content segments on the portal;
   wherein the encoding of the components of user interaction includes, at least in part, encoding a position of a particular content item of the first content items within the particular content item's corresponding segment on the portal;
   for each of a plurality of user segments, generating one or more ranking functions based on the user event data and based on said position of said particular content item within said portal;
   selecting a ranking function from the one or more ranking functions based on a first user segment of the plurality of user segments;
   for each of a plurality of second content items for which there is no user event data for any user, extracting a set of features for each second content item;
   with the selected ranking function, generating a rank for the second content items based on the set of features for each second content item;
   providing, based on the rank, at least one of the second content items.

2. The method of claim 1 wherein one of the components of user interaction being encoded is a time of the user interaction with the first content items.

3. The method of claim 1 wherein the step of selecting a ranking function based on the first user segment further includes selecting a ranking function based on context, wherein the context is, at least in part, a time of day when the selection is occurring.

4. The method of claim 1 wherein the step of, with the selected ranking function, generating a rank for the second content items based on the set of features for each second content item further comprises computing a probability of a user clicking on a particular second content item of the second content items.

5. A system comprising:
   one or more processors; and
   a hard disk drive storing a plurality of modules comprising:
   a first module that is operable to assemble user event data from a plurality of content segments on a portal, wherein the user event data encodes components of user interaction with first content items within each of the plurality of content segments on the portal;
   wherein the first module is further operable to encode a component of user interaction that is a position of a particular content item of the first content items within the particular content item's corresponding segment on the portal;
   a second module that is operable to, for each of a plurality of user segments, generate one or more ranking functions based on the user event data and based on said position of said particular content item within said portal;
   a third module that is operable to extract a set of features for each second content item of a plurality of second content items for which there is no user event data for any user;
   a fourth module that is operable to generate, based on a first of the ranking functions, a rank for the second content items based on the set of features for each second content item;
   a fifth module that is operable to provide, based on the rank, at least one of the second content items.

6. The system of claim 5, wherein the first module is further operable to assemble user event data which encodes a component of user interaction which is a time of the user interaction with the first content items.

7. The system of claim 5 wherein the fourth module further comprises being operable to generate the ranking based at least in part on a probability of a user clicking on a particular second content item of the second content items.

8. The method of claim 1 wherein generating the one or more ranking function is based, at least in part, on which social networks the first user segment is associated with.

* * * * *